(12) United States Patent
Tsai

(10) Patent No.: US 7,897,885 B2
(45) Date of Patent: Mar. 1, 2011

(54) DIGITIZER PEN CAPABLE OF UTILIZING SOLAR POWER

(76) Inventor: Huo-Lu Tsai, Taichung Hsien (TW)

( * ) Notice: Subject to any disclaimer, the term of this patent is extended or adjusted under 35 U.S.C. 154(b) by 1014 days.

(21) Appl. No.: 11/689,039

(22) Filed: Mar. 21, 2007

(65) Prior Publication Data

US 2008/0231613 A1    Sep. 25, 2008

(51) Int. Cl.
*G06F 3/033* (2006.01)
(52) U.S. Cl. .................................. 178/19.01
(58) Field of Classification Search ............ 345/173, 345/179; 178/18.01, 19.01
See application file for complete search history.

(56) References Cited

U.S. PATENT DOCUMENTS 4,726,044 A * 2/1988 Perna et al. .................. 377/15
6,943,670 B2 * 9/2005 Liguori et al. ............... 340/321
2004/0056850 A1 * 3/2004 Jaeger ........................ 345/179
2006/0240876 A1 * 10/2006 Chang ........................ 455/567

\* cited by examiner

*Primary Examiner*—Chanh Nguyen
*Assistant Examiner*—Tsegaye Seyoum
(74) *Attorney, Agent, or Firm*—Brooks Kushman P.C.

(57) ABSTRACT

A digitizer pen includes a solar cell for converting solar power into electrical energy, an energy storing circuit connected electrically to the solar cell for storing electrical energy therefrom, a magnetic field generating circuit for receiving electrical energy from one of the solar cell and the energy storing circuit, and a pen housing unit for receiving the solar cell, the energy storing circuit and the magnetic field generating circuit.

18 Claims, 8 Drawing Sheets

DIGITIZER PEN CAPABLE OF UTILIZING SOLAR POWER

BACKGROUND OF THE INVENTION

1. Field of the Invention

The invention relates to a digitizer pen, more particularly to a digitizer pen capable of utilizing solar power.

2. Description of the Related Art

A conventional digitizer pen cooperates with a digitizing tablet to serve as handwriting input equipment to a computer apparatus. During use, the conventional digitizer pen generates a magnetic field that can be converted by the digitizing tablet in a magnetic coupling manner into coordinate information for the computer apparatus. There are provided two ways for supplying electrical energy to the conventional digitizer pen. One way is that a non-rechargeable battery is used to supply the electrical energy, and the other way is that electrical energy is obtained by electromagnetic resonance with the digitizing tablet. However, if the non-rechargeable battery supplies electrical energy, replacement of the battery is required when exhausted, thereby resulting in inconvenience during use. Moreover, the replaced batteries can be harmful to the environmental. On the other hand, if electrical energy is obtained by electromagnetic resonance, the digitizing tablet is required to generate a relatively large electromagnetic filed to be received by the conventional digitizer pen in order to reach a certain amount of electrical energy, thereby resulting in relatively high power consumption by the digitizing tablet, relatively high costs due to complex design, and relatively high electromagnetic field radiation.

SUMMARY OF THE INVENTION

Therefore, the object of the present invention is to provide a digitizer pen capable of utilizing solar power that can overcome the aforesaid drawbacks of the prior art.

According to the present invention, a digitizer pen comprises:

a solar cell for converting solar power into electrical energy;

an energy storing circuit connected electrically to the solar cell for storing electrical energy therefrom;

a magnetic field generating circuit for receiving electrical energy from one of the solar cell and the energy storing circuit;

a power saving circuit; and a pen housing unit for receiving the solar cell, the energy storing circuit and the magnetic field generating circuit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
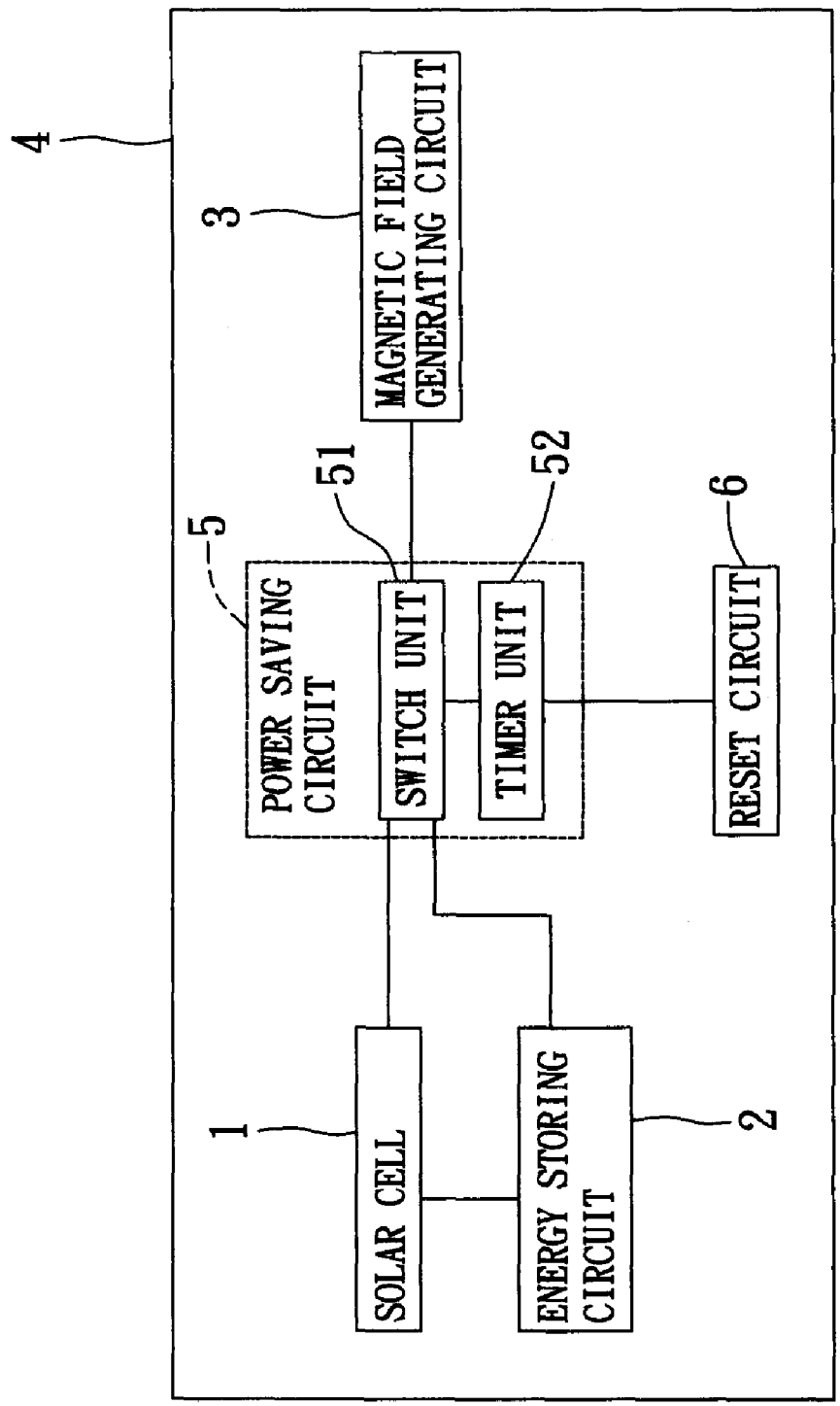
FIG. 1 is a schematic circuit block diagram illustrating the first preferred embodiment of a digitizer pen according to the present invention.

Before the present invention is described in greater detail, it should be noted that like elements are denoted by the same reference numerals throughout the disclosure.

Referring to FIGS. 1 to 4, the first preferred embodiment of a digitizer pen according to the present invention is shown to include a pen housing unit 4, a solar cell 1, an energy storing circuit 2, and a magnetic field generating circuit 3.

Figure 2:
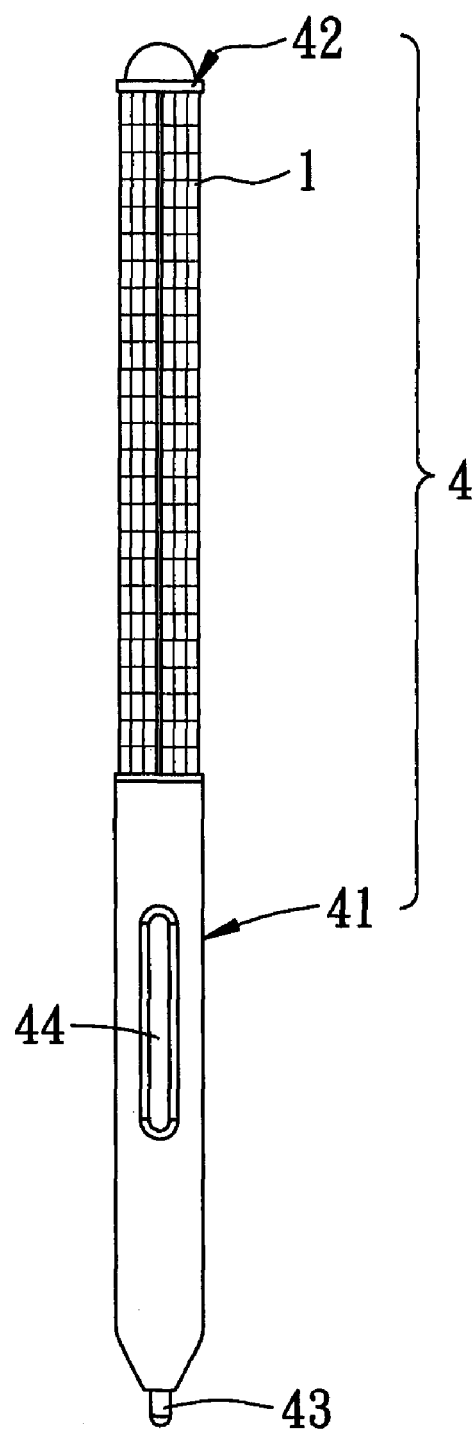
FIG. 2 is a perspective view showing the first preferred embodiment.
Figure 3:
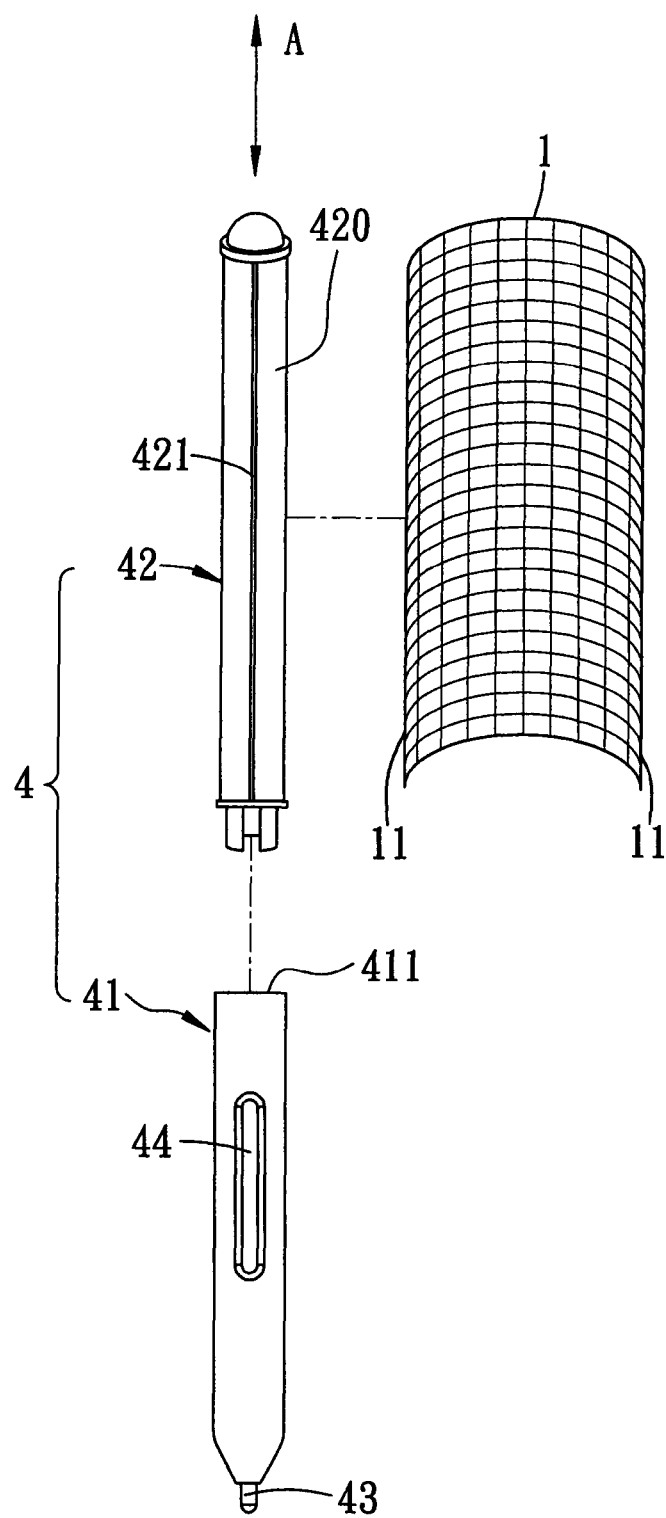
FIG. 3 is an exploded perspective view showing the first preferred embodiment.

In this embodiment, as shown in FIGS. 2 and 3, the pen housing unit 4 has a lower housing 41, and an upper housing 42 opposite to the lower housing 41 in a longitudinal direction (A) and detachably mounted on a top end 411 of the lower housing 41. The upper housing 42 has an outer surface 420 formed with an engaging groove 421 extending in the longitudinal direction (A). The lower housing 41 is further provided with a stylus 43 and a function key 44 operable for control purposes. Since the feature of the invention does not reside in the configuration of the stylus 43 and the function key 44, which are known to those skilled in the art, details of the same are omitted herein for the sake of brevity.

The solar cell 1 converts solar power into electrical energy. In this embodiment, the solar cell 1 is in the form of a sheet. An example of the solar cell 1 is an SP3-37 Power Film available from PowerFilm corporation and having a thickness of 0.025 mm. The solar cell 1 is wrapped around the outer surface 420 of the upper housing 42, and has opposite lateral sides 11 retained in the engaging groove 421.

Figure 4:
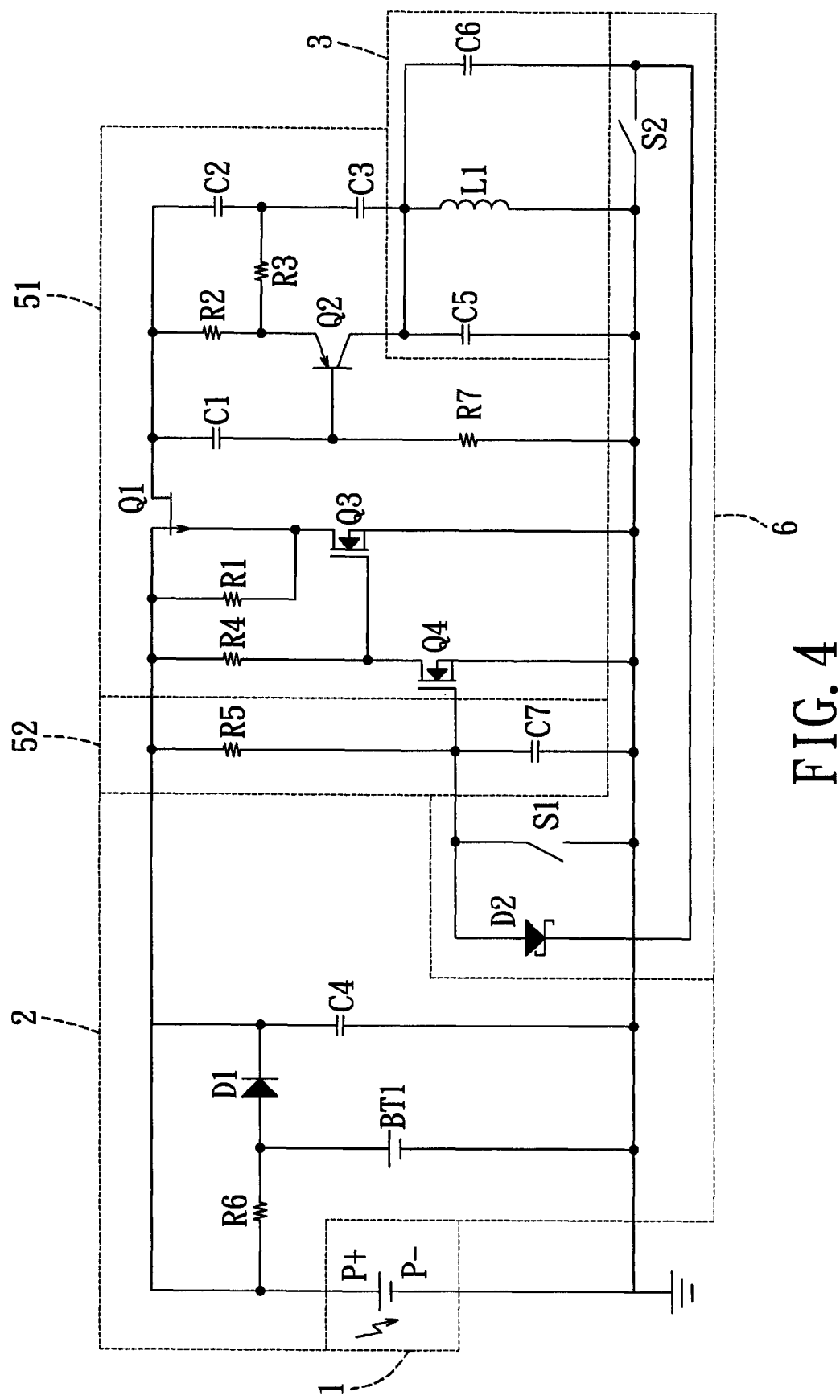
FIG. 4 is a schematic electrical circuit diagram illustrating the first preferred embodiment.

The energy storing circuit 2 is connected electrically to the solar cell 1 for storing electrical energy therefrom. In this embodiment, the energy storing circuit 2 includes a resistor (R6), a rechargeable battery (BT1), a diode (D1) and a capacitor (C4), as shown in FIG. 4.

The magnetic field generating circuit 3 receives electrical energy from one of the solar cell 1 and the energy storing circuit 2 for generating a magnetic field that is adapted to be converted into corresponding coordinate information by a digitizing tablet (not shown). In this embodiment, the magnetic field generating circuit 3 is an LC oscillator that includes capacitors (C5, C6) and an inductor (L1), as shown in FIG. 4.

To enable the solar cell 1 to provide sufficient electrical energy for the digitizer pen, a ratio (B/A) of power (B) consumed by the digitizer pen to power (A) generated by the solar cell is not greater than a preset value less than 1. The preset value is related to a brightness ratio (C) and an effective area ratio (D). The brightness ratio (C) is a ratio of a low brightness value (E) to a normal brightness value (F) greater than the low brightness value (E). The effective area ratio (D) is a ratio of an uncovered area of the solar cell 1 during use to a total area of the solar cell 1. Therefore, the relationship among the brightness ratio (C), the effective area (D) and the ratio (B/A) can be expressed as follows:

$$C \times D \geq B/A$$

Here, the low brightness value (E) corresponds to luminance of a display screen, such as an LCD screen. As such, even though the digitizer pen of this invention with a digitizing tablet serves as input equipment for a computer apparatus under dark conditions, due to the luminance of the display screen, electrical energy generated by the solar cell 1 can be maintained sufficient for the digitizer pen.

There is provided an example for describing power design using the SP3-37 Power Film as the solar cell 1. In the example, the power (A) generated by the solar cell 1 is 35 μW/mm2×a, wherein "a" is the total area of the solar cell 1. The power (B) consumed by the digitizer pen is 180 μW. The brightness ratio (C) is 1/10. Preferably, the effective area ratio (D) is 1/2. Therefore, $(1/10) \times (1/2) \ge 180 \, \mu W/(35 \, \mu W/mm^2 \times a)$ can be obtained according to the aforesaid relationship. As a result, $a \ge 3600/35 \, mm^2 = 102.9 \, mm^2$ is obtained. If the upper housing 42 has a diameter of about 10 mm, the solar cell 1 has a length in the longitudinal direction (A) not less than 3.28 mm(=102.9 mm2/(10 mm×3.14) that is much shorter than a length of the upper housing 42. In other words, the solar cell 1 can ensure supply of electrical energy for the digitizer pen even under poor ambient light conditions.

As shown in FIG. 1, the digitizer pen further includes a power saving circuit 5 connected electrically to the solar cell 1, the energy storing circuit 2 and the magnetic field generating circuit 3 for interrupting supply of electrical energy from the solar cell 1 and the energy storing circuit 2 to the magnetic field generating circuit 3 when the digitizer pen has remained idle for a predetermined time period, thereby reducing waste of power consumption. The power saving circuit 5 includes a normally closed control switch unit 51 and a timer unit 52. The switch unit 51 is connected electrically among the solar cell 1, the energy storing circuit 2 and the magnetic field generating circuit 3. The timer unit 52 is connected electrically to the switch unit 51 for switching the switch unit 51 from an ON-state to an OFF-state upon determining that an idle period of the digitizer pen has reached the predetermined time period. In this embodiment, as shown in FIG. 4, the switch unit 51 includes resistors (R1, R2, R3, R4, R7), capacitors (C1, C2, C3) and transistors (Q1, Q2, Q3, Q4). The timer unit 52 is an RC charging circuit that includes a resistor (R5) and a capacitor (C7). In an alternative embodiment, the switch unit 51 can be a mechanically-controlled switch, and the timer unit 52 can be a ripple counter.

Furthermore, the digitizer pen further includes a reset circuit 6 connected electrically to the power saving circuit 5 for resetting the timer unit 52 upon detecting operational activity of the digitizer pen, such as the operation of one of the stylus 43 and the function key 44, thereby switching the switch unit 51 from the OFF-state to the ON-state. In this embodiment, the reset circuit 6 includes a switch (S1) actuated by the stylus 43, a switch (S2) actuated by the function key 44, and a diode (D2), as best shown in FIG. 4.

In an actual operation, during normal use, the transistor (Q4) of the switch unit 51 is turned off, and the transistors (Q3, Q1, Q2) are turned on such that the solar cell 1 supplies electrical energy to the magnetic field generating circuit 3. At this time, if electrical energy from the solar cell 1 is more than that required by the magnetic field generating circuit 3, the rechargeable battery (BT1) is charged by a current from the solar cell 1 through the resistor (R6). While the solar cell 1 or the rechargeable battery (BT1) supplies electrical energy to the magnetic field generating circuit 3, the capacitor (C7) of the timer unit 52 is charged, thereby increasing a voltage across the capacitor (C7). Once the voltage across the capacitor (C7) increases to turn on the transistor (Q4) of the switch unit 51, the transistors (Q3, Q1, Q2) will be turned off, i.e., the switch unit 51 is going to the OFF-state, thereby interrupting supply of electrical energy from the solar cell 1 and the rechargeable battery (BT1) to the magnetic field generating circuit 3. At this time, the rechargeable battery (BT1) is charged by the current from the solar cell 1. During the OFF-state of the switch unit 51, the reset circuit 6 detects operational activity of the digitizer pen. Once the switch (S1) of the reset circuit 6 is turned on as a result of pressing of the stylus 43, the capacitor (C7) of the timer unit 52 will discharge (i.e., the timer unit 52 is reset) such that the transistor (Q4) of the switch unit 51 is turned off again and that the transistors (Q3, Q1, Q2) are turned on again. Also, once the switch (S2) of the reset circuit 6 is turned on as a result of pressing of the function key 44, the capacitor (C7) of the timer unit 52 will discharge to about 0.3V (i.e., the timer unit 52 is reset) such that the transistor (Q4) of the switch unit 51 is turned off again and that the transistors (Q3, Q1, Q2) are turned on again.

Figure 5:
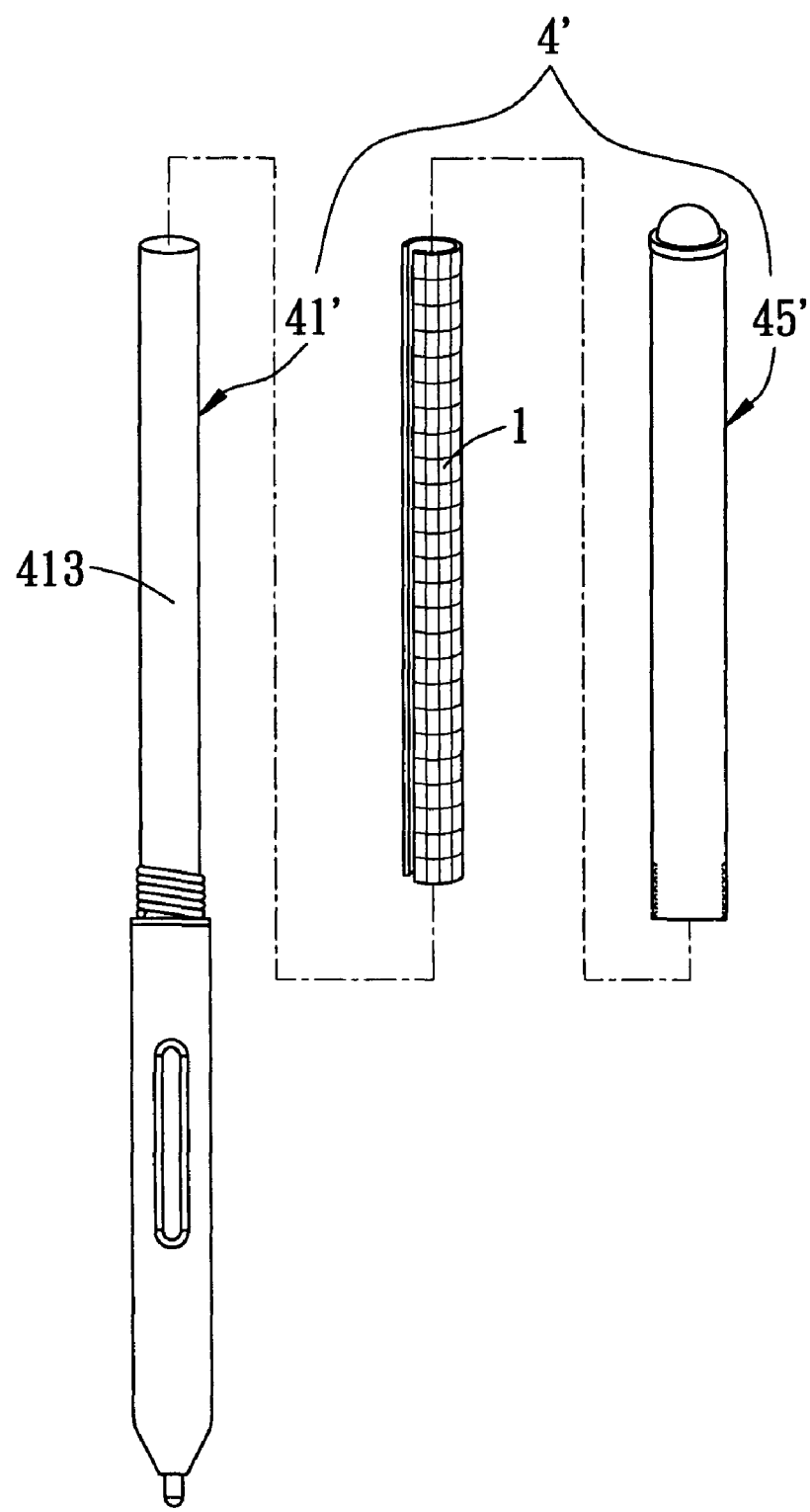
FIG. 5 is an exploded perspective view showing the second preferred embodiment of a digitizer pen according to the present invention.
Figure 6:
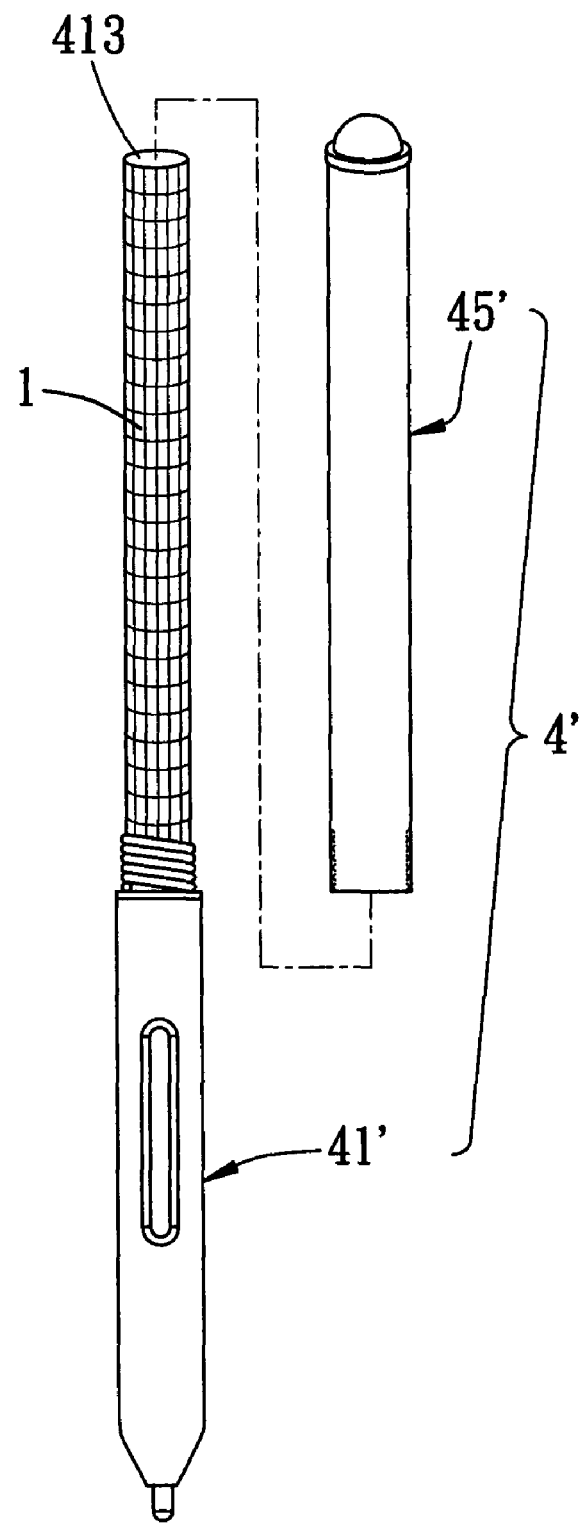
FIG. 6 is a partly exploded perspective view showing the second preferred embodiment.

FIGS. 5 and 6 illustrate the second preferred embodiment of a digitizer pen according to this invention, which is a modification of the first preferred embodiment. In this embodiment, the pen housing unit 4' has a main housing 41', and a transparent sleeve 45' sleeved on an upper portion 413 of the main housing 41'. The solar cell 1 is wrapped around the upper portion 413 of the main housing 41', and is disposed between the upper portion 413 of the main housing 41' and the sleeve 45'.

Figure 7:
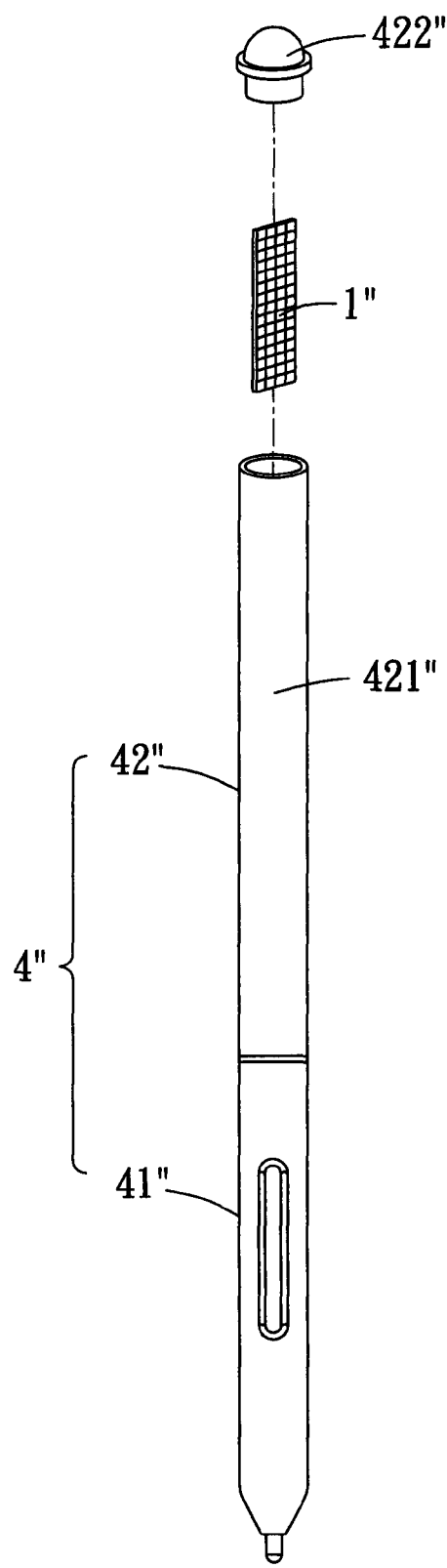
FIG. 7 is a partly exploded perspective view showing the third preferred embodiment of a digitizer pen according to the present invention.
Figure 8:
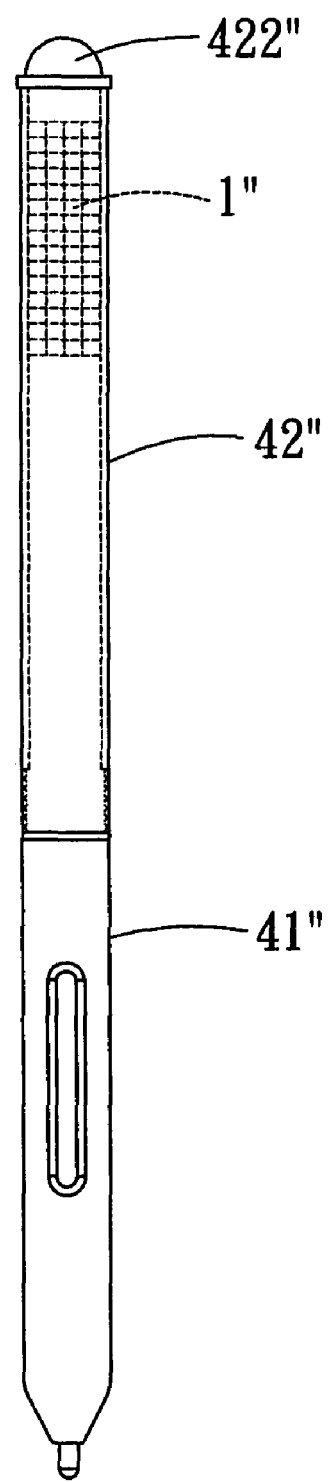
FIG. 8 is an assembled schematic view showing the third preferred embodiment.

FIGS. 7 and 8 illustrate the third preferred embodiment of a digitizer pen according to this invention, which is a modification of the first preferred embodiment. In this embodiment, the pen housing unit 4" has a lower housing 41", and a transparent upper housing 42" mounted on a top end of the lower housing 41". The upper housing 42" has a tubular body 421", and a cap 422" detachably mounted on a top end of the tubular body 421". The solar cell 1" is in the form of two stacked sheets, and is received in the upper housing 42".

In such a configuration, due to the presence of the solar cell 1 and the energy storing circuit 2, the digitizer pen of this invention can obtain sufficient supply of electrical energy therefrom without replacement of exhausted batteries as encountered in the abovementioned prior art, thereby resulting in convenience during use. Furthermore, due to the presence of the power saving circuit 5 and the reset circuit 6, the digitizer pen can efficiently waste of power.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A digitizer pen comprising:
    a solar cell for converting solar power into electrical energy;
    an energy storing circuit connected electrically to said solar cell for storing electrical energy therefrom;
    a magnetic field generating circuit for receiving electrical energy from one of said solar cell and said energy storing circuit;
    a pen housing unit for receiving said solar cell, said energy storing circuit and said magnetic field generating circuit; and
    a power saving circuit connected electrically to said solar cell, said energy storing circuit and said magnetic field generating circuit for interrupting supply of electrical energy from said solar cell and said energy storing circuit to said magnetic field generating circuit when said digitizer pen has remained idle for a predetermined time period.

2. The digitizer pen as claimed in claim 1, wherein said solar cell is in the form of a sheet.

3. The digitizer pen as claimed in claim 2, wherein:
said pen housing unit has a lower housing, and an upper housing opposite to said lower housing in a longitudinal direction and detachably mounted on a top end of said lower housing, said upper housing having an outer surface formed with an engaging groove extending in the longitudinal direction; and
said solar cell is wrapped around said outer surface of said upper housing, and has opposite lateral sides retained in said engaging groove.

4. The digitizer pen as claimed in claim 2, wherein:
said pen housing unit has a main housing, and a transparent sleeve sleeved on said main housing; and
said solar cell is wrapped around said main housing, and is disposed between said main housing and said sleeve.

5. The digitizer pen as claimed in claim 2, wherein:
said pen housing unit has a lower housing, and a transparent upper housing mounted on a top end of said lower housing; and
said solar cell is received in said upper housing.

6. The digitizer pen as claimed in claim 1, wherein a ratio of power consumed by said digitizer pen to power generated by said solar cell is not greater than a preset value less than 1.

7. The digitizer pen as claimed in claim 6, wherein the preset value is related to a brightness ratio that is a ratio of a low brightness value to a normal brightness value greater than the low brightness value.

8. The digitizer pen claimed in claim 7, wherein the low brightness value corresponds to luminance of a display screen.

9. The digitizer pen claimed in claim 6, wherein the preset value is related to an effective area ratio of an uncovered area of said solar cell during use to a total area of said solar cell.

10. The digitizer pen as claimed in claim 1, wherein said energy storing circuit includes at least one of a rechargeable battery and a capacitor.

11. The digitizer pen as claimed in claim 1, wherein said power saving circuit includes a normally closed control switch unit connected electrically among said solar cell, said energy storing circuit and said magnetic field generating circuit, and a timer unit connected electrically to said switch unit for switching said switch unit from an ON-state to an OFF-state upon determining that an idle period of said digitizer pen has reached the predetermined time period.

12. The digitizer pen as claimed in claim 11, wherein said switch unit includes a transistor, and said timer unit includes one of an RC charging circuit and a ripple counter.

13. The digitizer pen as claimed in claim 11, further comprising a reset circuit connected electrically to said power saving circuit for resetting said timer unit upon detecting operational activity of said digitizer pen.

14. A digitizer pen comprising:
a solar cell for converting solar power into electrical energy, said solar cell being in the form of a sheet;
an energy storing circuit connected electrically to said solar cell for storing electrical energy therefrom;
a magnetic field generating circuit for receiving electrical energy from one of said solar cell and said energy storing circuit; and
a pen housing unit for receiving said solar cell, said energy storing circuit and said magnetic field generating circuit;
wherein said pen housing unit has a main housing, and a transparent sleeve sleeved on said main housing; and
wherein said solar cell is wrapped around said main housing, and is disposed between said main housing and said sleeve.

15. A digitizer pen comprising:
a solar cell for converting solar power into electrical energy;
an energy storing circuit connected electrically to said solar cell for storing electrical energy therefrom;
a magnetic field generating circuit for receiving electrical energy from one of said solar cell and said energy storing circuit; and
a pen housing unit for receiving said solar cell, said energy storing circuit and said magnetic field generating circuit;
wherein a ratio of power consumed by said digitizer pen to power generated by said solar cell is not greater than a preset value less than 1.

16. The digitizer pen as claimed in claim 15, wherein the preset value is related to a brightness ratio that is a ratio of a low brightness value to a normal brightness value greater than the low brightness value.

17. The digitizer pen claimed in claim 16, wherein the low brightness value corresponds to luminance of a display screen.

18. The digitizer pen claimed in claim 15, wherein the preset value is related to an effective area ratio of an uncovered area of said solar cell during use to a total area of said solar cell.

* * * * *